N. SPARKS.
HYDRAULIC DUMP FOR AUTOMOBILE TRUCKS.
APPLICATION FILED JAN. 20, 1919.

1,332,008.

Patented Feb. 24, 1920.
3 SHEETS—SHEET 2.

Inventor
Nelson Sparks
By Reynolds & Cook
Attorney

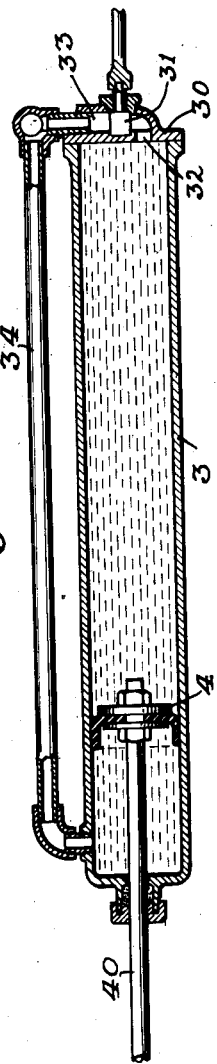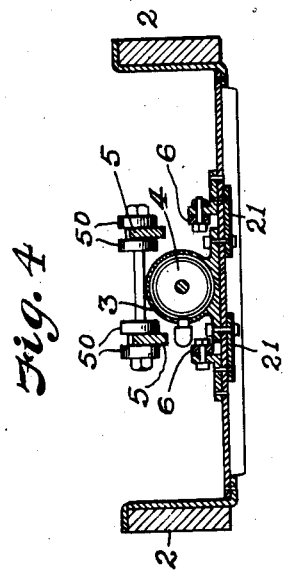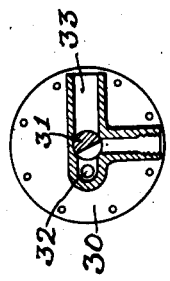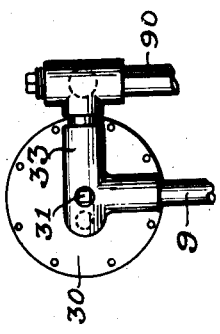

UNITED STATES PATENT OFFICE.

NELSON SPARKS, OF SEATTLE, WASHINGTON.

HYDRAULIC DUMP FOR AUTOMOBILE-TRUCKS.

1,332,008.  Specification of Letters Patent.  Patented Feb. 24, 1920.

Application filed January 20, 1919. Serial No. 272,142.

*To all whom it may concern:*

Be it known that I, NELSON SPARKS, a citizen of the United States, and resident of the city of Seattle, county of King, State of Washington, have invented certain new and useful Improvements in Hydraulic Dumps for Automobile-Trucks, of which the following is a specification.

My invention relates to automobile dump trucks and consists of a mechanism whereby the bed of an automobile may be raised into a position to discharge its contents by gravity.

The object of my invention is to provide a simple, strong and reliable mechanism whereby the bed of an automobile may be raised to an inclination such that its contents will slide freely out of the open end thereof.

This invention will hereinafter be described and the features thereof, which I deem to be novel and upon which I desire patent protection, will be defined in the claim which terminates this specification.

In the accompanying drawings I have shown my invention embodied in the type of construction which I now prefer to use.

Fig. 4, is a transverse section taken through one end of the hydraulic cylinder, showing the relation of the parts forming the bed raising mechanism.

Fig. 5, is a longitudinal section through the hydraulic cylinder showing the piston therein.

Fig. 6, is an exterior view of the cylinder head.

Fig. 7, is a section showing the ports and the valves for controlling the same at this end of the cylinder.

Figure 1:
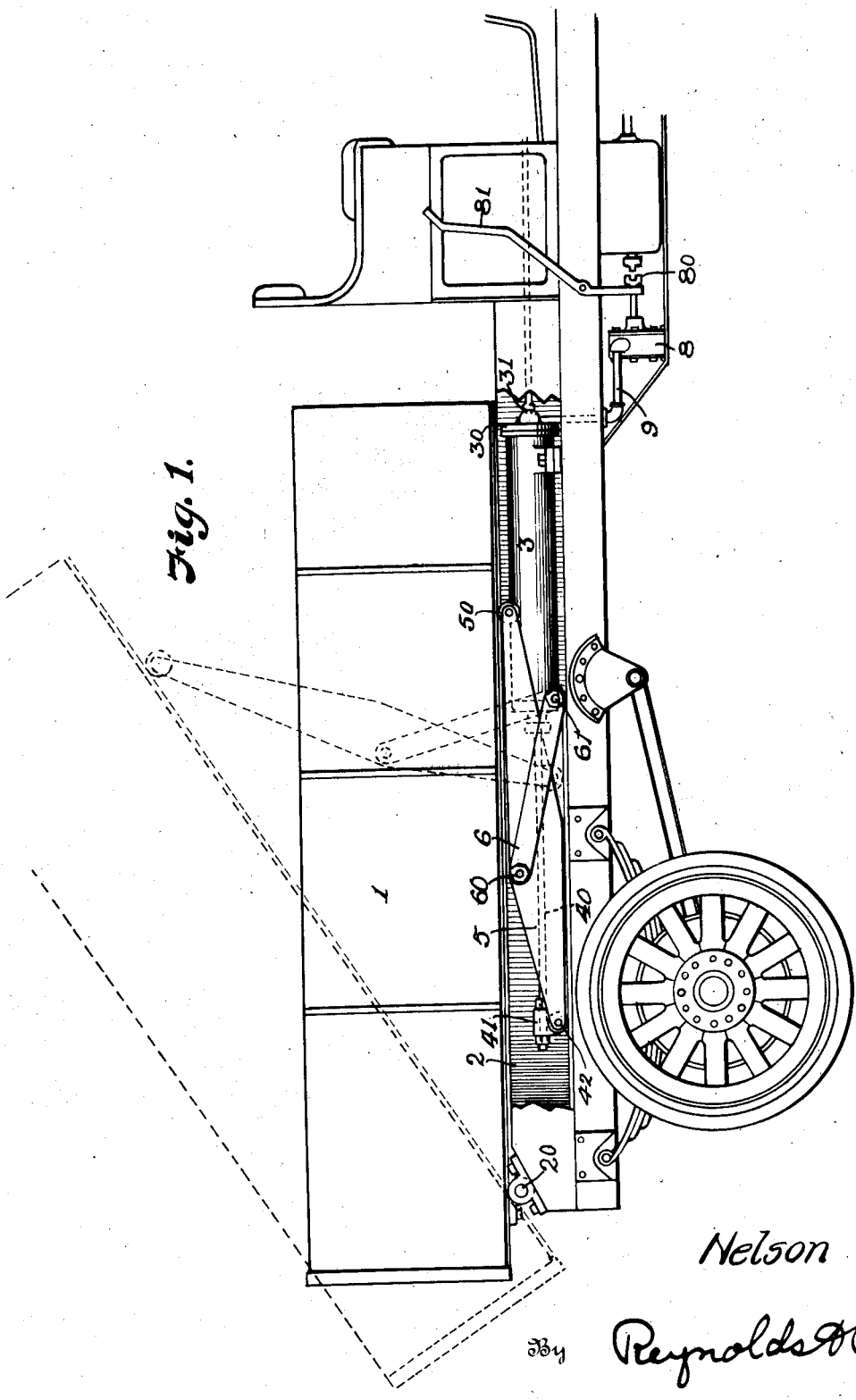
Figure 1, is a side view of a truck having my invention therein, a portion of the frame at one side being broken away to show the body-raising mechanism and the raised position of the bed and the bed raising mechanism being shown in dotted lines.
Figure 2:
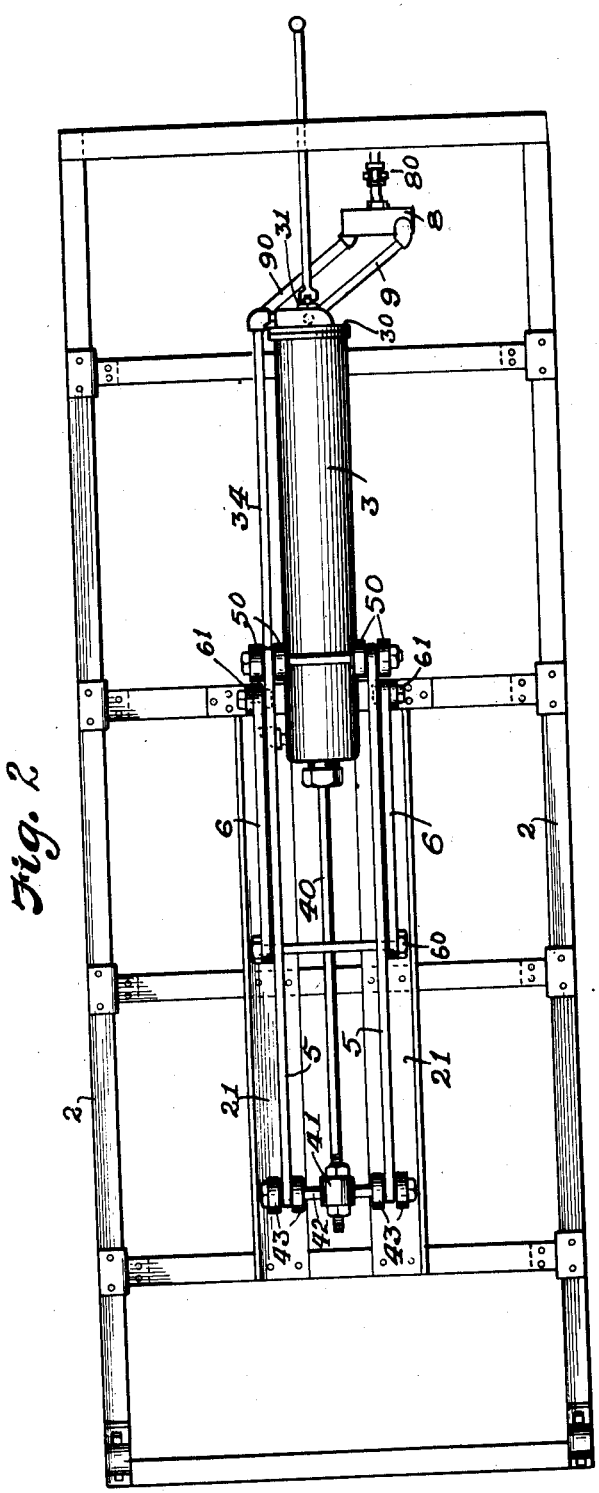
Fig. 2, is a plan view of the bed raising mechanism.
Figure 3:
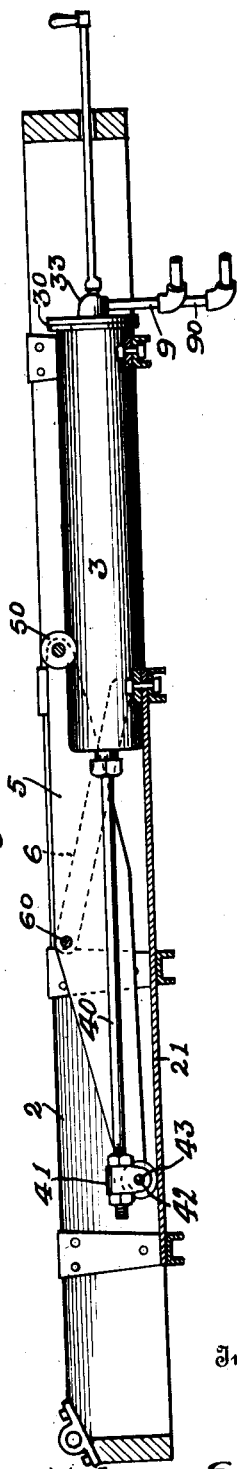
Fig. 3, is a longitudinal section of the truck frame which contains the bed raising mechanism.

In applying my mechanism to an automobile truck the truck body is mounted upon a base 2, formed of bars which rest upon the chassis bars of the automobile. If the truck is designed to have the bed raising mechanism which forms my invention built in at the time the truck is constructed, the frame 2 might well be omitted and the mechanism be built in the ordinary chassis frame. The bed is pivoted at its rear end to the frame 2, by means of pivot bars 20, of which one part is carried by the frame 2 and the other part by the bed 1. The bed may thus have its forward end raised until the angle of its inclination is sufficient to discharge the contents.

Supported in the frame 2 and extending lengthwise thereof, preferably in a central position, is a hydraulic cylinder 3 which supplies the power for raising the bed. This is securely fastened to the frame. It has within it a piston 4 the stem 40 of which extends toward the rear or pivoted end of the automobile bed.

Supported from the frame 2 are two guide bars 21. These are herein shown as consisting of angle plates and form a guide way upon which the cross head 41 may travel. This cross head 41 has a shaft 42, upon which are mounted wheels 43 which bear and travel upon the bar 21.

Pivoted upon the shaft 42 are the lifting levers 5. Pivoted to the lifting levers at a point 60 intermediate of their length, are the fulcrum links 6. These links are pivoted at a point, as 61, in the direction of the forward end of the truck upon the frame or other fixedly positioned member. The forward ends of the lifting levers 5 lie close under the bottom of the bed 1.

The three pivots, one of which consists of the shaft 42 in the cross head, the central pivot 60, which connects the fulcrum link and the lifting levers, and the point 61 to which the other end of the fulcrum links are pivoted, are placed so that the central pivot 60, when the raising levers are down, is some little distance above a straight line connecting the pivots 42 and 61.

These members between these points form a pair of toggle levers. If power be applied to the movable end 42 of this combination, so as to force the cross head toward the pivot point 61, the central pivot 60 will be raised and this will raise the forward ends of the lifting levers 5 and the bed with them. These parts will eventually assume a position about that indicated by dotted lines in Fig. 1. In this position the angle of inclination of the bed is sufficient to cause a free discharge of the contents, if the rear end of the bed is opened.

To reduce the friction incident to the raising of the bed, due to the fact that the ends of the bed raising levers 5 have movement lengthwise of the bed during the raising movement, I prefer to provide this end of the levers with wheels or rollers as 50.

In order to operate the hydraulic cylinder, I provide a pump, as 8, and means whereby the same may be connected with the propelling motor of the truck. This may be done through the means of a clutch device, as 80, which is controlled by a hand-lever 81, or by any other means found suitable for this purpose. The discharge from this pump is conveyed through a pipe or pipes as 90 and 34 to the outer end of the hydraulic cylinder, the pipe 9 conveying the liquid from the other end of the cylinder back to the pump. The head 30 has a port 32 therein and a valve as 31, capable of being turned so as to bypass the fluid through pipe 33 from pipe 90 to pipe 9. In this manner the operation of the piston may be controlled so as to cause it to reciprocate in the cylinder and the bed to thereby be raised and lowered.

When it is desired to raise the bed in order to dump its contents, the pump is connected with the source of power and the valve 31 is placed in the position shown in Fig. 7 which directs the fluid through pipes 90 and 34 into the rear end of the cylinder 3, the fluid from the other end passing through pipe 9 to the pump. The bed will then be raised. When it is desired to lower the bed the valve 31 is shifted into such position as to connect the two ends of the cylinder through bypass 33. The bed will then descend due to its own weight and the rate of descent will be controlled by the friction caused by the flow of the fluid through the channels and ports.

What I claim as my invention is:

On a truck in combination, a body supporting frame, a body pivoted by one end to said frame, a power cylinder having a piston therein and located under the swinging end of the bed, a crosshead and guides therefor located under the pivoted end of the bed, a piston rod connected with said crosshead, a bed lifting lever pivotally connected by one end with the crosshead and having a movable supporting engagement with the bed toward the swinging end thereof, and a fulcrum lever having one end pivoted on the said frame beyond the limit of travel of the crosshead toward the cylinder, said fulcrum lever being pivoted by its other end to a middle part of the bed lifting lever.

Signed at Seattle, Washington, this 14th day of January, 1919.

NELSON SPARKS.